United States Patent [19]

Becker

[11] Patent Number: 4,758,144

[45] Date of Patent: Jul. 19, 1988

[54] ACCUMULATING HEADS FOR PRODUCTION OF LAMINATED PLASTIC CYLINDRICALLY CONFIGURED BLANKS

[75] Inventor: Rudolf Becker, Berlin, Fed. Rep. of Germany

[73] Assignee: BEKUM Maschinenfabriken GmbH, Berlin, Fed. Rep. of Germany

[21] Appl. No.: 61,665

[22] Filed: Jun. 15, 1987

[30] Foreign Application Priority Data

Jun. 14, 1986 [DE] Fed. Rep. of Germany ....... 3620144

[51] Int. Cl.[4] ............................................. B29C 47/20
[52] U.S. Cl. ............................ 425/133.1; 425/376 R; 425/462; 425/467; 425/532; 425/376 B
[58] Field of Search ..................... 425/114, 133.1, 532, 425/462, 376 R, 376 B, 466, 467

[56] References Cited

U.S. PATENT DOCUMENTS

| | | | |
|---|---|---|---|
| 3,611,494 | 10/1971 | Feuerherm | 425/376 R |
| 4,120,633 | 10/1978 | Feuerherm | 425/462 |
| 4,149,839 | 4/1979 | Iwawaki et al. | 425/532 X |
| 4,152,104 | 5/1979 | Przytulla et al. | 425/133.1 X |
| 4,179,251 | 12/1979 | Hess et al. | 425/532 X |
| 4,297,092 | 10/1981 | Goron | 425/133.1 |
| 4,422,838 | 12/1983 | Iwawaki et al. | 425/532 X |
| 4,565,515 | 1/1986 | Maier | 425/462 X |
| 4,609,340 | 9/1986 | Irwin et al. | 425/376 R X |

FOREIGN PATENT DOCUMENTS 2604247 9/1976 Fed. Rep. of Germany .

Primary Examiner—Richard L. Chiesa
Attorney, Agent, or Firm—Pravel, Gambrell, Hewitt, Kimball & Krieger

[57] ABSTRACT

Accumulating heads to produce preliminary blanks for the production of hollow plastic articles such as containers by the blow process (known as the "joint extrusion process"), such blanks, being of cylindrical "tube" configuration and also laminates which are layers of different material. Suitable accumulating tube heads for the joint extrusion process are disclosed wherein the layers retain their relative positions and thickness ratios over their entire length up until expelled from the nozzle. The accumulating heads each have a plurality of coaxial annular feed passages, each fed from a different extruder, which open into an annular space and passage. The annular passage is located between the facing walls of concentric inner and outer packing washers. Concentric inner and outer annular pistons slide on the opposed surfaces of the washers and reciprocate in the reservoir chamber for expelling the plastic laminate through an annular nozzle conduit and an annular nozzle to form the laminated preliminary blanks.

9 Claims, 3 Drawing Sheets

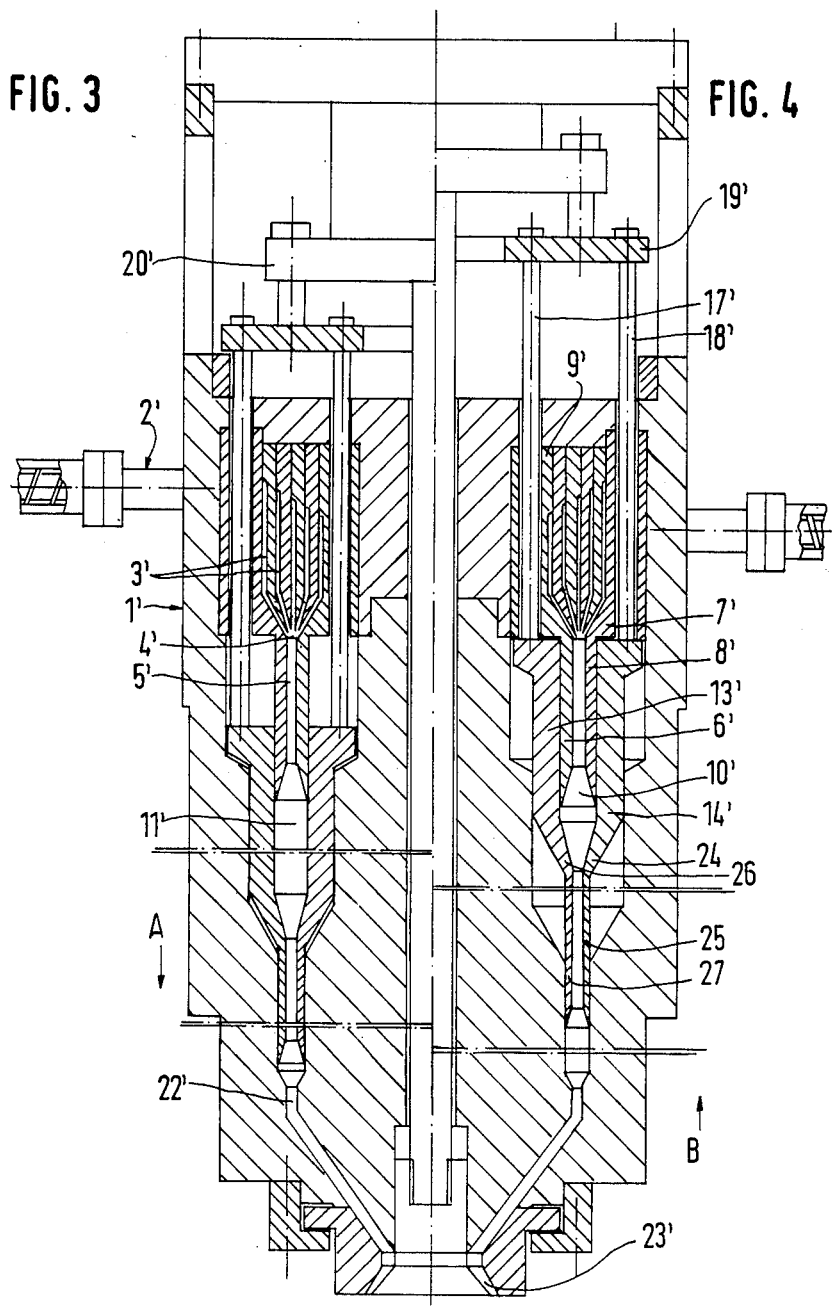

ACCUMULATING HEADS FOR PRODUCTION OF LAMINATED PLASTIC CYLINDRICALLY CONFIGURED BLANKS

FIELD OF INVENTION

This invention involves devices known as accumulating heads which are used to produce laminated plastic cylindrically or "tube or tube-like" configured preliminary blanks, or parisons, used for the joint extrusion process. More particularly, the invention is directed to such devices wherein up to five laminated layers are formed in each device in a concentric annular space therein, such space being defined by concentric inner and outer washers and a piston is used to expel the laminated plastic from the devices to form the preliminary blanks.

BACKGROUND OF THE INVENTION

The so-called "Joint Extrusion Process" is known for the production of hollow plastic articles by inflation of a preliminary blank in a partitioned blow mold, the blank being produced in a tube forming device or tip which is fed from an extruder. In this process the tube formed in the device and expelled therefrom, after which it is crosscut to form the preliminary blanks for the subsequent blowing, is a laminate of a plurality of concentric layers. Such multiple layered preliminary blanks are used for the production of hollow articles which are often containers. The contents of such containers, composed of traditionally easily inflatable material, may diffuse into the containers' walls or otherwise become sources of problems, such as swelling. It has been suggested that other materials be used which do not react to contents, e.g. oil, fats or solvents, for production of containers. But the available selection of these materials is limited and are quite expensive in comparison with the standard materials used for production in the blow process. Accordingly, it is not generally practicable to produce such containers with thin walls because the containers must have a certain minimum strength in view of their physical and chemical characteristics to prevent ruptures, and must also have stability and rigidity which can not be attained if their walls are too thin. The joint extrusion process permits, however, the production of satisfactory containers having thinner walls. In such process, in the subsequent mold productions from blanks, a very thin so-called "blocking layer" or "barrier layer" of a diffusion-preventive and expensive material is cladded on both sides over a relatively thicker so-called "support layer" of traditional, less expensive blowable material. To guarantee a good connection between the cladding layer and the inside and outside support layers, adhesive agents or thin connection layers are often inserted between the layers, so that in practice a five-layer composite customarily results. There are many modifications of this process of little interest insofar as the scope of the instant invention is concerned, which modify the three-layer composite to a seven-layer composite by the incorporation of further intervening layers of appropriate materials.

Traditional tube forming devices used in blow technology, and also extruded tube which is used for the production of smaller containers and the like, operate continuously, i.e. heated plastic material is fed continuously through one or more extruders into the tube forming device where it is formed into tubes and from which it is continuously discharged in quantities required for units to be fed to the mold. However, this continuous tube production does not suffice in the production of larger hollow articles, for instance larger containers, for which large preliminary blanks are required. When large diameter tubes with relatively large mass which thus are of considerable weight, are expelled from the tube forming device, the weight of the material can cause breakage or deformation at the discharge end. The "dynamic air pressure or accumulating head" was therefore developed for the production of larger tubes. This device has a dynamic air pressure chamber, in which the material for production of a preliminary blank is stored until it is pressed out by a piston. The stored material is pressed out much more rapidly by the piston than would be the case with a continuous discharge of the same quantity from the reserves. The hose is formed in the accumulating head and thus the danger of its being unduly stretched or ruptured are avoided.

When a conventional piston, acting on plastic material in the reservoir chamber of the tube forming device, presses directly on the material and the reservoir chamber is filled with only one material, the piston action does not adversely affect the material or process. On the other hand, if a dynamic air pressure or reservoir chamber is filled with a plastic laminate, for example with a five-layer laminate, because then the piston may not act uniformly on the laminate, the reaction of the plastic laminate to the action of the piston during the expulsion process is more complex and the layers may buckle or the layers' composite may be otherwise adversely affected.

With a known tube forming device according to DE-OS No. 26 04 247, the individual layers produced in annular passages are expelled by an annular piston and thus are brought coaxially to the junction point forming the laminate. This, however, does not relate to a accumulating head, because a fed-in laminate is not involved. Rather each individual layer for the laminate formation is brought up to a point shortly before the nozzle. The construction is complicated, requiring, for example, five separately powered and controlled annular pistons for a five-layer laminate.

SUMMARY OF THE INVENTION

The reservoir tip in accordance with the invention which is used for production of multiple layers jointed extruded plastic tubes which are subsequently to be worked as mold blanks in partitioned blow molds comprises an integral insert ring which carries an annular block that defines feed passages. Each fed passage is connected to a separate one of five extruders. The feed passages meet in an annular space within the accumulating head wherein the laminate is formed. The laminate so formed passes between two concentric annular washers into a further annular space. Surrounding the sides of the washers are a pair of pistons which are reciprocated upwardly and downwardly together, sliding against the outer faces of the washers, in an annular expansion space from which, via a nozzle conduit, the plastic is expelled through a nozzle in a continuous cylindrical form. The passage defined between the two washers terminates in diverging bevels, also defined by the lower ends of the washers, which are aligned with bevels of the pistons' lower faces while in their uppermost positions which are similarly diverging in a downward direction. Through this apparatus the plastic material layers in the plastic laminate retain their relative positions and ratios of thicknesses from where they are formed to where they are expelled through the nozzle due in part to the pumping action of the two concentric annular pistons which are mounted for reciprocation on a common annular plate and are caused to reciprocate by means of control means. Thus, a primary object of the invention is to provide an accumulating head device which is suitable for use in conjunction for the joint extrusion process and which expels a "tube" as a laminate of plastic material layers which maintain their predetermined positions and thickness ratios over their entire periphery as they move through the accumulating head device wherein a piston is used for expulsion of the laminate from the reservoir chamber.

Other objects, adaptabilities and capabilities will be appreciated and understood by those skilled in the art from the disclosure herein as well as, of course, reductions to practice conforming to such disclosure, reference being had to the accompanying drawings and which:

BRIEF DESCRIPTION OF THE DRAWINGS

FIG. 3 is a vertical cross-section of one-half of a further embodiment of an accumulating head according to the invention in filled position; and FIG. 4 is a vertical cross-sectional view of one-half of the accumulating head of FIG. 3 in the position following the expulsion of the material.

DESCRIPTION OF THE PREFERRED EMBODIMENTS

Figure 1:
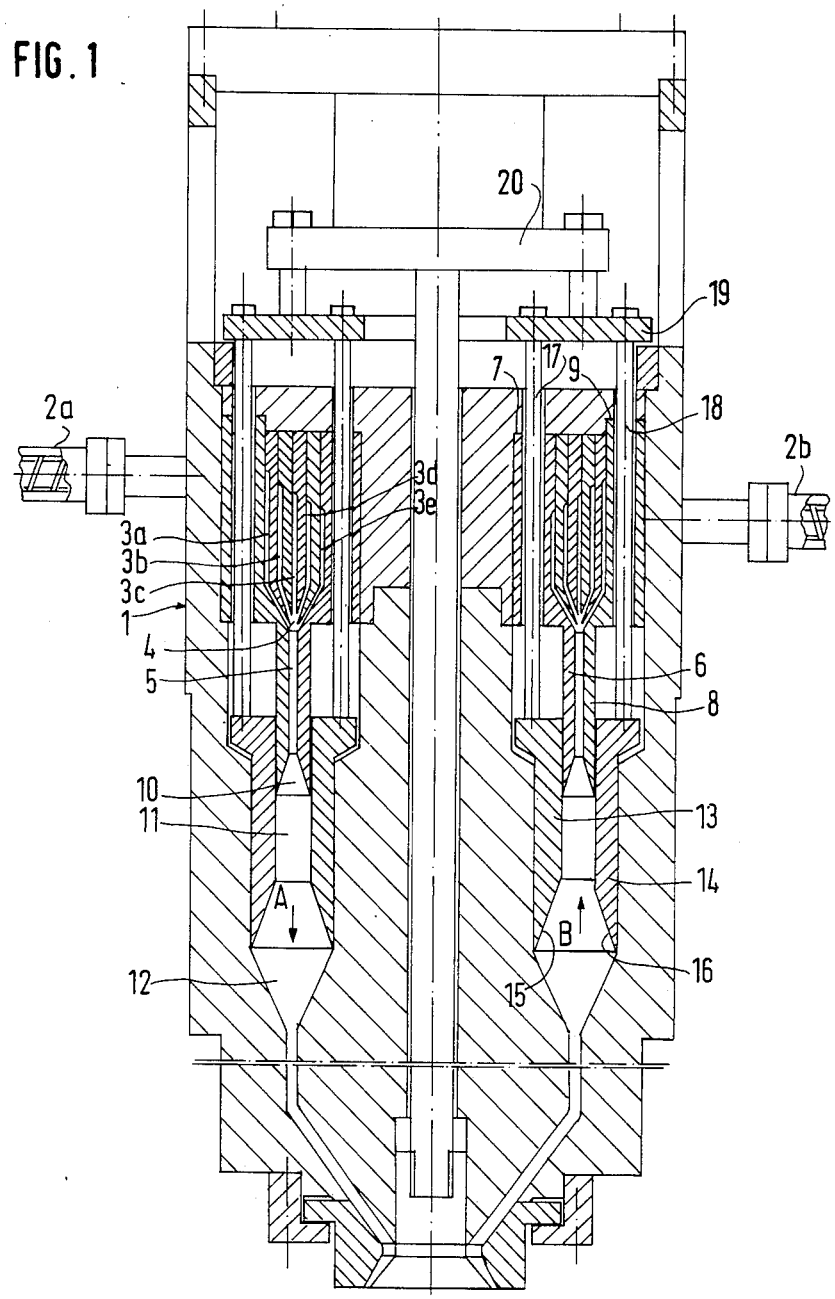
FIG. 1 is a vertical cross-section of an accumulating head in reduced scale according to the invention in its filling position.

The accumulating head 1 shown diagrammatically in FIG. 1 is suitable for production of a five-layer laminate that is fed different plastic materials from five extruders which are distributed around the periphery, only two of which 2a and 2b are shown. Extruders 2a and 2b are collectively referred to by numeral 2 herein.

Each extruder feeds in a known manner through a horizontal passage, which is subdivided into two branches around the periphery, into one of the feed passages 3a, 3b, 3c, 3d and 3e, collectively referred to by numeral 3 herein, which meet in an annular space 4. The laminate is therefore formed at this juncture, annular space 4, which then flows as a composite through an annular passage 5 downwardly in the direction of arrow A.

Annular passage 5 is defined by an inside packing washer 6 of an insert ring 7 and by an outside packing washer 8 of an insert ring 9. Packing washers 6 and 8 are beveled to diverge at their ends to form a passage widening space 10 which constitutes the transition between annular passages 5 and an annular expansion space 11. The latter is widened still further by beveled surfaces 15 and 16 of pistons 13 and 14, which surfaces diverge in the direction of flow until an annular converging passage 12 is reached in space 11 that converges downwardly.

Expansion space 11 is defined radially down to passage 12 by the two annular pistons, inboard annular piston 13 and outboard annular piston 14, which terminate at their lower faces in bevels 15 and 16 diverging in the direction of flow.

Material flowing in through space 11 including passage 12 in the direction of arrow A exerts an upward pressure within that space in acting on surfaces 15 and 16 to urge pistons 13 and 14 in direction B.

Annular pistons 13 and 14 are connected by respective inboard and outboard rods 17 and 18 with an annular cross-tie plate 19 which is movable downwardly and upwardly together by means of a suitable control mechanism designated by reference numeral 20 in the respective directions indicated by arrows A and B.

Figure 2:
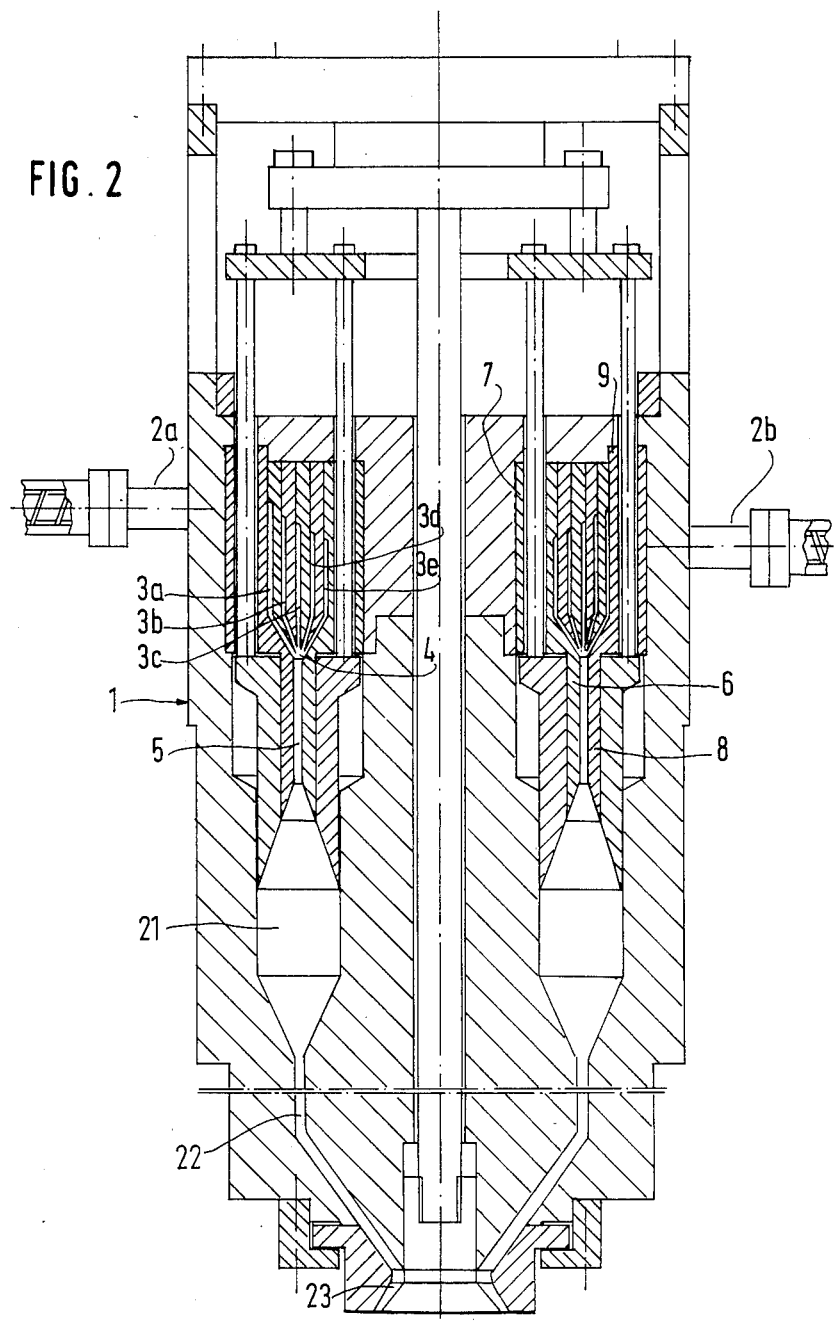
FIG. 2 is a view similar to FIG. 1 of the tip position before the expulsion of material present in the reservoir chamber.

After the materials are fed by extruders 2 through feed passage 3, space 4 into annular passage 5, they are formed in a laminate which has expanded radially in expansion chamber or space 11. This laminate, in space 11, including passage 12, lifts both annular pistons 13 and 14, whereupon a reservoir chamber 21 is formed in space 11 as illustrated in FIG. 2. Pistons 13 and 14 are then lowered by control 20 via annular plate 19 and rods 17 and 18, which press the laminated materials out of chamber 21 via nozzle conduit 22 through nozzle 23, from which the laminate is discharged as a tubular preliminary blank, adapted to the size and weight as specified for production into an article in a partitioned blow mold.

The feeding of the laminated materials from extruders 2 into the middle of chamber 21 and in being acted upon and acting on by double ring pistons 13 and 14, the vertically transmitted laminar materials remain in their proper structural relationships. The layers are actually compressed together as to coadunate with the percentage of each of the layer's respective thicknesses distribution remaining the same, contrasting to accumulating head inside feeding according to the state of the art.

A layer construction may also be attained with the state of the art procedure by when the reservoir chamber is filled. But in such process, the piston plunging into the reservoir chamber shears off the inside area of the laminated structure, and with the filling process this sheared off area is laid out parallel to the front of the conical corresponding surface of the expulsion piston. The laminate structure is therefore broken before plastic material flowing through feed passages 3 can build up again. The result is that, because of the sheared off and thus missing portion, the discharged tube does not correspond to the desired structures. The sheared off area displays no uniform structure and breaks the desired layer construction of the fed-in material. In the instant invention, however, the corresponding piston, being divided into outside and inside pistons 13 and 14 as opposed to the state of the art structure, plunges into the reservoir chamber, but engages the layer construction between bevel surfaces 15 and 16 and with the expulsion process thrusts it forward, without any shearing action.

The embodiment of the accumulating head of FIGS. 3 and 4 according to the invention is essentially identical to that of FIGS. 1 and 2 and therefore identical parts are identified by the same reference numerals, differentiated by a prime. Thus in this case the head is generally indicated as 1' for the production of a laminate of up to five layers and for this purpose has five separate extruders, which together are designated 2' disposed generally around the periphery, which feed the materials into separate vertical feed passages designated generally 3', which meet in the converged annular space 4' to form the laminate. The laminate thus formed flows through annular passage 5', which is defined between packing washer 6' of insert ring 7' and packing washer 8' of insert ring 9'. The ends of packing washers 6' and 8' are beveled, diverging in the direction of flow, and thus form a widening annular space 10', to which connects to an expansion chamber 11'. In this embodiment, expansion chamber 11' is also defined by an inside annular piston 13' and an outside annular piston 14', and the annular pistons are connected by respective inboard and outboard rods 17' and 18' with an annular cross-tie plate 19' which can be moved by a control device 20' in axial directions relative to the reservoir tip wherein there is defined a nozzle conduit 22' and a nozzle 23'.

In this case, however, in contrast to the embodiment of FIGS. 1 and 2, annular piston 14' continues in the form of a taper member 24 and therefrom as packing washer 25. In a similar manner annular piston 13' continues as a taper member 26 and therefrom as a packing washer 27.

The flowing materials are held together following their formation as a laminate in annular space 4' through annular passage 5', through annular widening space 10', and annular expansion chamber 11' defined between annular pistons 13' and 14', and through the further annular space defined between packing washers 25 and 27, and relatively far into nozzle conduit 22', almost as far as nozzle 23'. The laminated materials flowing in the direction of arrow A meet resistance in the space defined between taper members 24 and 26 when as seen in FIG. 4 annular pistons 13' and 14' with packing washer rings 25 and 27 are pressed downwardly into the position shown in FIG. 3. When this position is reached, annular piston arrangements 13'-24-25, 14', 26-27 are raised by control 20' via plate 19' and rods 17' and 18' in the direction of arrow B to the position shown in FIG. 4. Chamber or space 11' is thus reduced in volume as shown in FIG. 4 and, the laminate is forced to flow in the direction of arrow A via nozzle conduit 22' through nozzle 23'.

The material flowing in laminar form remains together all the way from annular space 4, at which the laminate is formed, as far as the reservoir chamber and from there through conduit 22' and to nozzle 23' without disturbances of its layer structure and other possible destructive influences are not a problem.

Although I have described the preferred embodiments of my invention, it is to be understood it is capable of other adaptations and modifications which will fall within the scope of the following claims.

Having claimed my invention, what I claim as new and to be secured by Letters Patent of the United States is:

1. An accumulating head for the production of multiple layer jointly extruded plastic tubes which are further worked as mold blanks for partitioned blow molds, the accumulating head comprising a plurality of coaxial annular feed passages, each said feed passage fed from a respective extruder so that the plastic material from each said feed passage forms one layer of the tube, all said passages converging in an annular space to form a laminate, said annular space disposed between facing walls of an inner annular packing washer and an outer annular packing washer, said washers being slidably arranged to bear against an inner annular piston and an outer annular piston, an annular reservoir chamber having an unobstructed spatial connection with said annular space, said pistons being reciprocal relative to said space to move said laminate from said reservoir chamber.

2. An accumulating head according to claim 1 wherein said annular space forming said laminate opens concentrically into the middle of said annular reservoir chamber.

3. An accumulating head according to claim 1 wherein each said packing washer is an integral part of an insert ring which carries an annular block that defines said feed passages.

4. An accumulating head according to claim 1 wherein said annular pistons are connected to be raised or lowered by control rods.

5. An accumulating head according to claim 1 wherein said annular pistons terminate at their lower aspects in diverging bevels which continue as terminal bevels of said packing washers when said annular pistons are in their uppermost positions, said bevels together forming the upper aspect of said reservoir chamber.

6. An accumulating head according to claim 1 comprising an annular nozzle conduit and annular nozzle for receiving said laminate from said reservoir chamber.

7. An accumulating head according to claim 1 wherein said radially measured thickness across said annular pistons is substantially greater than the radially measured thickness across said washers, the opposed surfaces of said washer being slidably received by the facing surfaces of said annular pistons.

8. An accumulating head according to claim 7 wherein said reservoir chamber is formed at least in part by facing walls of said annular pistons.

9. An accumulating head according to claim 8 comprising control means for moving said annular pistons vertically, an annular nozzle conduit and an annular nozzle spatially connected to said reservoir chambers, said annular pistons being raised preparatory to forcing plastic materials in said reservoir chamber through said annular nozzle conduit and said annular nozzle.

* * * * *